Jan. 10, 1939.  L. DARIMONT  2,143,303
SCREEN FOR CINEMATOGRAPHIC PROJECTIONS
Filed Feb. 18, 1937
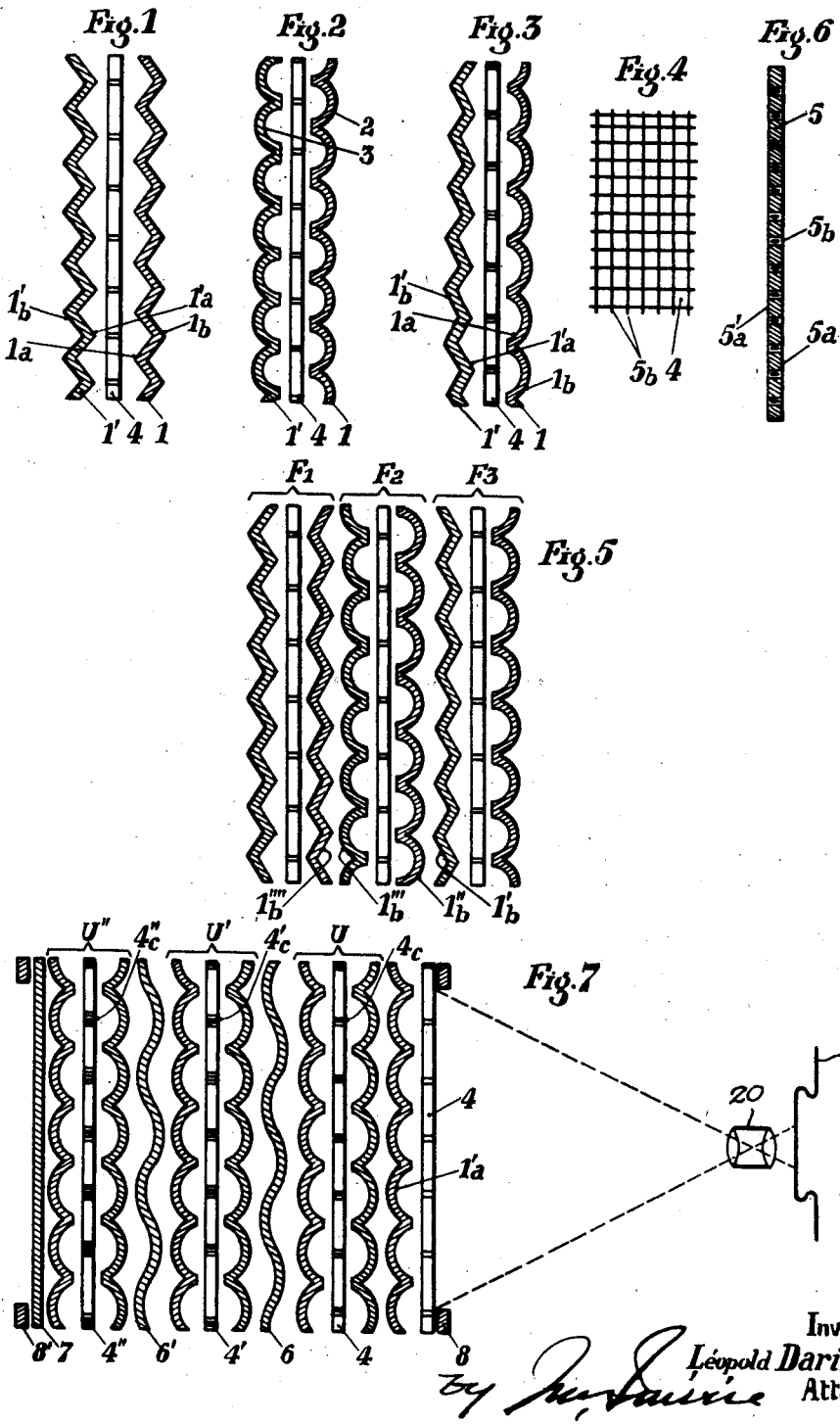
Inventor:
Léopold Darimont
Attorney Patented Jan. 10, 1939

2,143,303

UNITED STATES PATENT OFFICE 2,143,303

SCREEN FOR CINEMATOGRAPHIC PROJECTIONS

Léopold Darimont, Anderlecht-Brussels, Belgium

Application February 18, 1937, Serial No. 126,486
In Belgium January 6, 1937

8 Claims. (Cl. 88—24)

The present invention concerns screens for cinematographic and other projections and has for its object the possibility of obtaining, with a film taken under normal conditions and with a normal cinematographic projector, and by the accentuation of contrasts (shade and light), a perfect and natural notion of relief, of depth and aerial perspective of the picture projected and seen on the front of the screen.

This effect is obtained by the formation in the depth or thickness of the composite screen, of several pictures, so called resulting images, each of which is formed by the combination or superposition of at least three pictures of which the median one is only a partial picture, the successive resulting pictures being separated by luminous zones, more or less irisated, of which the effects, which extend through the whole thickness of the screen, unite and combine in such a way as to give out an accentuation of the contrasts (shade and light) and thus the impression of relief, depth and aerial perspective.

Practically, the resulting pictures are obtained by "unities" or "elements" which, superposed in proper numbers and under certain conditions form the permanent screen.

If one takes a thin sheet of transparent material of uniform or nearly uniform thickness, and which has on its two surfaces a multitude of small salients and (or) small inward curves, and when this sheet has been treated in appropriate manner so as to dull the lustre of one of its surfaces, and should one project a beam of light on the polished surface, this will produce upon this surface an infinity of small centers of reflection cut by particles of light, to the detriment of the initial beam, the rest of the beam piercing the surface and continuing its trajectory.

By superposing a number of these sheets in such a way as to place alternately into contact two half-dull surfaces and two brilliant surfaces, this will produce, during the projection, disordinate reflections between each pair of the brilliant surfaces combined with a mutual return from which will result luminous zones of diffused light localized between two brilliant surfaces.

If a light picture is projected, luminous zones of various intensities will be formed between the polished surfaces, that is to say shaded off, the depths will correspond more or less to the shade and light effects of the projected picture, whilst by low diffusion, a hardly visible picture of feeble density will be formed on each half-frosted surface.

If, as precedingly stated, one afterwards interpose between the polished surfaces of the superposed sheets, a reticular surface, it will be formed, during the projection of a luminous picture on these assembled surfaces, and besides the above mentioned pictures, a partial image on each of these reticular surfaces, each localized in the luminous zone; each partial image thus wrapped in a kind of too intensive halo, will be too much attacked and so be subjected to an attenuation of contrasts (light and shade) with reduction of initial density, which is most disadvantageous to the obtaining of the impression of relief.

But if, accordingly with the invention, one combines or juxtaposes a number of these "unities" interposing at the same time the reticular surfaces not between the polished surfaces, but between the half-frosted surfaces, of the embossed sheets, the luminous zone, which for a unity lighted alone, would form and attenuate the density of the partial median picture, does not exist any more. On the contrary, these shaded luminous zones will be formed between the successive "unities"; thus the three pictures of each unity can combine and reinforce each other to form for each unity a composite result or picture, of good texture, good visibility, and perfectly distinct. The shaded luminous zones which are formed between these different resultant images tend to make the contrasts of shade and light more marked in the projected picture, and moreover to give the impression that the resulting pictures, formed respectively, in front of and behind any luminous zone, reject one another, and that each resulting picture takes volume and becomes more or less salient. These different effects, happening throughout the entire thickness of the screen, accumulate and combine in such manner as to produce a very particular visibility, the impression of relief, extension into depth with a sensation of normal aerial spacement between the different planes and objects.

Experience has proved that the resulting picture will be more dense and more visible in proportion that the real or material surface of reflection of the reticular surface of each "unity" be more important, and that the most dense of the resulting pictures be placed preferably the nearest possible to the bottom of the screen, these networks of the different "unities" should preferably have real or material surfaces which are different, and the "unity" with the largest real surfaced network should be placed preferably the nearest possible to the bottom of the screen, and in contrast, the "unity" with the least real surfaced network should be placed as near as possible to the front of the screen; this may be done for instance by the use of a network of which the wires or lines be of a greater and greater thickness which will result in the bettering of the contrasts of light and shade and a greater visibility of the resulting pictures.

To the assembly of "unities", one may combine a number of thin surfaces of transparent material of uniform or nearly uniform thickness, corrugated or embossed etc., but having both surfaces polished. These surfaces are inserted between the different "unities", which results in complementary disordinate reflections combined with particles of diffused light, of which the effects are added in respective layers to increase the intensity of the corresponding shaded luminous zone, producing complementary accentuation of contrasts (shade and light).

A semi-reflective surface, opaque or nearly so, capable of rejecting the light without rejecting the picture in a definite form, such as a metallic surface or metallized surface, smooth or more or less polished, placed up against this assembly of surfaces in such a way as to receive the light picture at the last moment, will have as result the increasing of the intensity of the luminous zones which adds to the contrasts of shade and light, and above all at the rear of the picture, as well as the impression of extension into depth at this part of the picture, with an accentuated sensation of the aerial perspective of the projected picture.

A drawing is annexed as an example without limiting the invention.

Figs. 1, 2 and 3 represent respectively two different cuts or views, and three different combinations, more or less schematic, of the "unities" which form the screen.

Fig. 4 is a face view of a reticular surface.

Fig. 5 represents an assembly of "unities" according to Figs. 1, 2 and 3.

Fig. 6 is a cut of a bracket surface with its lines.

Fig. 7 is a cut of a screen comprising the "unities", intermediate surfaces and a bottom surface.

According to Figs. 1, 2 and 3 the constituting "unities" of the screen may be formed: of at least two thin surfaces of transparent material of uniform thickness or nearly so, such as cellulose acetate, but of which the two faces are irregular, that is to say, present a multitude of small salients and (or) small concavities of any shape. In Fig. 1 the cut of each sheet is in zigzag-form 1 and 1'. In Fig. 2 the surface 1 has on one face convexities 2 placed in front of the cavities 3 of the opposite face of the same surface 1'; in Fig. 3 is combined a sheet of Fig. 1 with a sheet of Fig. 2; one could also take convex surfaces with meniscular cuts or partially so, and which do not figure on the drawing, but of which essentially the faces in regard 1ª and 1'ª are more or less frosted. The sheets 1—1' hold (Figs. 1, 2 and 3) between the half-frosted faces, a reticular surface 4, for instance cotton tulle (Fig. 4). These constituting surfaces of the different "unities" are respectively held together among themselves to form three types of "unities" according to Figs. 1, 2 and 3. These constituent surfaces of each "unity" form an immovable whole, without uniform air intervals between these surfaces, this in order to obviate the excessive indistinctness of the pictures.

One may form a screen by superposition, according to Fig. 5, of such "unities" designated as F¹, F² and F³. The irregular polished faces 1'b and 1"b; 1"'b and 1""b, etc., of the successive "unities" are placed face to face, which will produce during the projection of a luminous picture through this assembly of "unities", for each "unity" and at the network or lines of each of them, a partial image formed by reflections, or complete diffusions, and at the embossed surfaces which imprison them (half-frosted surfaces) a complete picture but of feeble diffusion. These three pictures formed by each "unity" combine and reinforce mutually so as to produce for each "unity" a composite picture or result, of great density, very visible and very distinct. Between the resulting images is formed respectively, a luminous zone more or less irisated and shaded off thanks to the disordinate reflections or light particles and to the irisations which are produced on the irregular brilliant faces of the "unities" near to, and by which is at first produced an accentuation of the contrasts (light and shade) whilst the resulting pictures formed in front of and behind such a zone appear to take on an impression of extension into depth, volume, and appear more or less salient. These effects through the whole depth of the screen add and combine advantageously and the result is a peculiar perception and a sensation of relief, of depth and aerial space between the different planes and objects situated in the different planes.

Fig. 6 represents the cut of a thin surface 5 of transparent material of uniform or nearly uniform thickness, such as cellulose acetate, of plane or more or less irregular surface, but of which essentially the two faces 5a and 5'a are more or less frosted or softened, serving as a bracket or support for an appropriate network, opaque or nearly so, 5b, for example obtained by impression with a typographic roller, with ink or oily varnish of a dull white or light colour; on such a sheet provided with its network or lines there will, on projection of a luminous picture, be formed by reflection on lines 5b a partial image, and by feeble diffusions, a complemental image on the two half-frosted surfaces. This surface with its appropriate lines or network may advantageously be used instead of the reticular surface for the formation of the different unities which constitute the screen. The "unities" thus made thinner and more compact, will produce resulting pictures, denser, more visible and more distinct, which will accentuate the contrasts (light and shade) as also the effect of relief, depth and aerial perspective.

The reticular surfaces 4, 4' and 4" of the respective unities U, U' and U" (see Fig. 7) will preferably comprise lines of real surface (material surface) and differing from one "unity" to another. A "unity" with a less important real surface of reflection 4c, for instance with wires or thin lines, should always be in front of a "unity" with lines of a real surface of greater importance, for example with broader lines 4'c, which will increase the visibility of the different corresponding resulting pictures, in such a way that the most visible picture be placed nearer the bottom of the screen and the less developed resulting picture near the front of the screen.

Fig. 7 again represents the "unities" U, U' and U" corresponding to Fig. 2 superposed, to which are combined the thin surfaces 6, of transparent material of uniform or nearly uniform thickness such as cellulose acetate, but of which the two faces are essentially polished, but more or less unequal, either undulated, embossed, etc., capable of giving off disordinate reflections of the luminous particles. The sheets 6—6' are placed between the polished surfaces of the different successive "unities". In Fig. 7, the objective lens of the projection apparatus is indicated at 20 and the film strip at 21.

According to Fig. 7 the intensity of the intermediate shaded luminous zones will be increased by addition of a surface 7 more or less reflective, such as a metallic or metalized surface, opaque or nearly so, smooth or more or less polished, without being brightly polished, placed against the last constituent "unity" forming the bottom of the screen. The very thin metallic surface is preferably fixed on a cellulose support (not shown).

By superposing a sufficient number of "unities" to utilize all the reflected light by the surface of the bottom 7, one will obviate the dazzle on the screen during the projection and obtain a maximum of relief, depth and sensation of aerial perspective, as desired. The number of superposed "unities" to obtain this result depends upon the diffusing power of the different elements constituting the screen, and on the intensity of luminous projection; but as the intensity of projection may be modified at will, the number of "unities" to be superposed can be determined after a few trials and afterwards according to the results obtained. The number may be normally 3 "unities".

The front "unity" should preferably be without one of these embossed surfaces, and one should take off that which is the first that has to receive on its brilliant surface the luminous picture, thus laying open the line or network 4 and partially the half-frosted face 1'a, this to attenuate the reflection of light by such a brilliant surface so as to obviate the shine of the screen during projection.

The whole is now assembled in a proper manner on a framework 8 and 8', that is to say without leaving any uniform air intervals between the different surfaces in such a way as to obviate unnecessary or exaggerated indistinctness.

Having now fully described my said invention, what I claim and desire to secure by Letters Patent, is:

1. In a screen for projections from a cinematographic or like apparatus, a group made up of sheets of transparent material of substantially uniform thickness, the surfaces of the sheets being formed to present a multitude of narrow irregularities, one face of each sheet being more or less frosted, the opposite face of each sheet being brilliant, the sheets being united in a body with their more or less frosted faces innermost and their brilliant faces outermost, and a reticulated net strip interposed between the sheets.

2. A construction as defined in claim 1, wherein the multitude of irregularities in the sheets are so formed as to provide a series of narrow points of disordinate reflection of diffused light with shaded zones in variegation throughout the screen.

3. A construction as defined in claim 1, wherein the net is non-brilliant.

4. A construction as defined in claim 1, wherein the net is of cotton gauze and wherein the sheets are of transparent cellulose acetate.

5. A screen for projections from cinematographic and like apparatus, comprising a plurality of spaced units, each unit comprising a non-brilliant cotton gauze strip interposed between frosted faces of sheets of cellulose acetate, the faces of the sheets next the gauze being frosted and the faces of the sheets remote from the gauze being brilliant, the sheets being provided with a multitude of irregularities, and an end sheet forming the rear unit and having a brilliant face toward the projection apparatus.

6. A construction as defined in claim 5, wherein the threads forming the cotton gauze have an increasing diameter from the front of the screen toward the back thereof.

7. A screen for projections of a cinematographic or like apparatus, comprising a plurality of units arranged in spaced order to form a screen, each of the units comprising reticular surfaces secured between the frosted surfaces of two sheets of transparent material, the faces of such screen remote from the reticular surfaces being brilliant and such sheets being formed with a multitude of irregularities, the respective units being superimposed longitudinally of a frame, together with a metallic sheet having a brilliant face forming the rear unit with the brilliant face toward the projection apparatus.

8. A projection screen for use with cinematographic or like projection apparatus comprising the combination of several groups of three sheets, each group being made up of two sheets of transparent material of substantially uniform thickness with one reticulated sheet between them, the surfaces of the said two sheets being formed to present a multitude of narrow ribs, undulations or the like, one face of each of the two sheets being more or less frosted and the opposite face of each sheet being brilliant, the three sheets being united to form a body constituting the group, the more or less frosted faces being innermost and the brilliant faces outermost.

LEOPOLD DARIMONT.